US009720832B2

(12) United States Patent
Evangelinos et al.

(10) Patent No.: US 9,720,832 B2
(45) Date of Patent: Aug. 1, 2017

(54) STORE OPERATIONS TO MAINTAIN CACHE COHERENCE

(71) Applicant: International Business Machines Corporation, Armonk, NY (US)

(72) Inventors: Constantinos Evangelinos, Andover, MA (US); Ravi Nair, Briarcliff Manor, NY (US); Martin Ohmacht, Yorktown Heights, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 87 days.

(21) Appl. No.: 14/671,050

(22) Filed: Mar. 27, 2015

(65) Prior Publication Data

US 2016/0283377 A1    Sep. 29, 2016

(51) Int. Cl.
| | |
|---|---|
| *G06F 12/00* | (2006.01) |
| *G06F 13/00* | (2006.01) |
| *G06F 13/28* | (2006.01) |
| *G06F 12/0815* | (2016.01) |
| *G06F 12/0842* | (2016.01) |
| *G06F 12/0875* | (2016.01) |

(52) U.S. Cl.
CPC ...... *G06F 12/0815* (2013.01); *G06F 12/0842* (2013.01); *G06F 12/0875* (2013.01); *G06F 2212/452* (2013.01); *G06F 2212/622* (2013.01)

(58) Field of Classification Search
CPC ......... G06F 2212/452; G06F 2212/622; G06F 12/0815; G06F 12/0875; G06F 12/0842

USPC .......................................... 711/141, 138, 130
See application file for complete search history.

(56) References Cited

U.S. PATENT DOCUMENTS

| | | | |
|---|---|---|---|
| 7,925,836 B2 | 4/2011 | Stevens et al. | |
| 8,271,730 B2 | 9/2012 | Piry et al. | |
| 8,386,664 B2 | 2/2013 | Chen et al. | |
| 2010/0268896 A1 | 10/2010 | Arimilli et al. | |
| 2010/0332763 A1 | 12/2010 | Kornegay et al. | |
| 2011/0219208 A1* | 9/2011 | Asaad .................... G06F 15/76 712/12 |

(Continued)

OTHER PUBLICATIONS

Darnell et al., Automatic Software Cache Coherence through Vectorization, ACM, Proceedings of the 6th international conference on Supercomputing (ICS '92), pp. 129-138.*

(Continued)

*Primary Examiner* — Tuan Thai
*Assistant Examiner* — Shane Woolwine
(74) *Attorney, Agent, or Firm* — Cantor Colburn LLP; Jennifer Davis

(57) ABSTRACT

In one embodiment, a computer-implemented method includes encountering a store operation during a compile-time of a program, where the store operation is applicable to a memory line. It is determined, by a computer processor, that no cache coherence action is necessary for the store operation. A store-without-coherence-action instruction is generated for the store operation, responsive to determining that no cache coherence action is necessary. The store-without-coherence-action instruction specifies that the store operation is to be performed without a cache coherence action, and cache coherence is maintained upon execution of the store-without-coherence-action instruction.

12 Claims, 7 Drawing Sheets

(56) References Cited

U.S. PATENT DOCUMENTS

2013/0173894 A1* 7/2013 Yan .................. G06F 9/3885
                 712/228

OTHER PUBLICATIONS

Constantinos Ecangelinos, et al., "Improved Store Operations to Maintain Cache Coherence", U.S. Appl. No. 14/744,055, filed Jun. 19, 2015.
List of IBM Patents or Patent Applications Treated as Related; (Appendix P), Filed Aug. 23, 2015; 2 pages.
Arimilli, L.B., Dhawan, S.S. & Satz, P.J. (Feb. 1995). Improved direct memory access write performance for a rs/6000 graphics system. IBM Technical Disclosure Bulletin, 38(2), 241-242.
Kelm et al., "Cohesion: A Hybrid Memory Model for Acceleratior," ISCA'10, Jun. 19-23, 2010, Saint-Malo, France. 12 pgs.
Kelm, J.H. (2010). "Hybrid coherence for scalable multicore architectures.", Dissertation: Doctor of Philosophy in Electrical and Computer Engineering in the Graduate College of the University of Illinois at Urbana-Champaign, 209 pgs.

* cited by examiner

STORE OPERATIONS TO MAINTAIN CACHE COHERENCE

STATEMENT OF GOVERNMENT INTEREST

This invention was made with Government support under Contract No.: B599858 awarded by Department of Energy. The Government has certain rights in this invention.

BACKGROUND

Various embodiments of this disclosure relate to cache coherence and, more particularly, to improved store operations to maintain cache coherence.

In a computing architecture having a host processor and an accelerator, the processor and accelerator both have processing elements and may share access to main memory. In that case, the host processor may have one or more private caches, such as a Level 1 (L1) cache, for each processing element. In contrast, the accelerator may have no private caches. Cache coherence is the state of the cache being consistent with other caches or main memory. In this case, cache coherence thus requires the processor's private caches to be consistent with main memory.

With a processor-in-memory implementation, such as the active memory cube (AMC), operations come from processing lanes within the AMC and from the host processor, and cache coherence is maintained through the use of a coherence bit replicated in 32-byte sectors of a 128-byte cache line. When set to a value of 1, the coherence bit indicates that the host processor has a copy of the memory line in one of its caches. When set to a value of 0, the coherence bit indicates that the memory line is not stored in any of the host processor's caches.

When a processing lane performs a store operation, a memory controller examines the coherence bit of the memory line being stored to determine whether the host processor must flush any of its copies of the memory line in private caches. To this end, the memory controller performs a read-modify-write operation for each store operation. More specifically, the coherence bit is read to determine whether the memory line exists in a private cache; the coherence bit and line data of the memory line are modified; and the modified memory line is written back to memory. This leads to an increase in latency and a reduction in bandwidth utilization with respect to store operations.

In an AMC, error-correcting code (ECC) bits are used at a granularity of 32 bytes, applicable to a 32-byte sector. The read-modify-write operation cannot be avoided for stores that target a subset of the 32-byte sector, because the ECC bits apply to the entire 32 bytes and must be modified if any data within the 32 bytes is modified. Thus, the entire sector, including both old and newly stored data, must be read to generate the ECC bits. When the store operation applies to a multiple of 32 bytes, the new ECC bits for the applicable sectors can be generated without a read-modify-write. No reading action needs to be performed on the sector in that case because the entire 32 bytes are new to the sector. However, a read operation is still needed to read the coherence bit.

SUMMARY

In one embodiment of this disclosure, a computer-implemented method includes encountering a store operation during a compile-time of a program, where the store operation is applicable to a memory line. It is determined, by a computer processor, that no cache coherence action is necessary for the store operation. A store-without-coherence-action instruction is generated for the store operation, responsive to determining that no cache coherence action is necessary. The store-without-coherence-action instruction specifies that the store operation is to be performed without a cache coherence action, and cache coherence is maintained upon execution of the store-without-coherence-action instruction.

In another embodiment, a system includes a memory having computer readable instructions and one or more processors communicatively coupled to the memory. The one or more processors are configured to encounter a store operation during a compile-time of a program, where the store operation is applicable to a memory line. The one or more processors are further configured to determine that no cache coherence action is necessary for the store operation. The one or more processors are further configured to generate a store-without-coherence-action instruction for the store operation, responsive to no cache coherence action being necessary for the store operation. The store-without-coherence-action instruction specifies that the store operation is to be performed without a cache coherence action, and cache coherence is maintained upon execution of the store-without-coherence-action instruction.

In yet another embodiment, a computer program product for maintaining cache coherence includes a computer readable storage medium having program instructions embodied therewith. The program instructions are executable by a processor to cause the processor to perform a method. The method includes encountering a store operation during a compile-time of a program, where the store operation is applicable to a memory line. Further according to the method, it is determined that no cache coherence action is necessary for the store operation. A store-without-coherence-action instruction is generated for the store operation, responsive to determining that no cache coherence action is necessary. The store-without-coherence-action instruction specifies that the store operation is to be performed without a cache coherence action, and cache coherence is maintained upon execution of the store-without-coherence-action instruction.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

DETAILED DESCRIPTION

Various embodiments of this disclosure maintain cache coherence with reduced latency and improved bandwidth utilization, by determining when a coherence check is needed and implementing a store operation that avoids a cache coherence check when the check is not needed.

Figure 1:
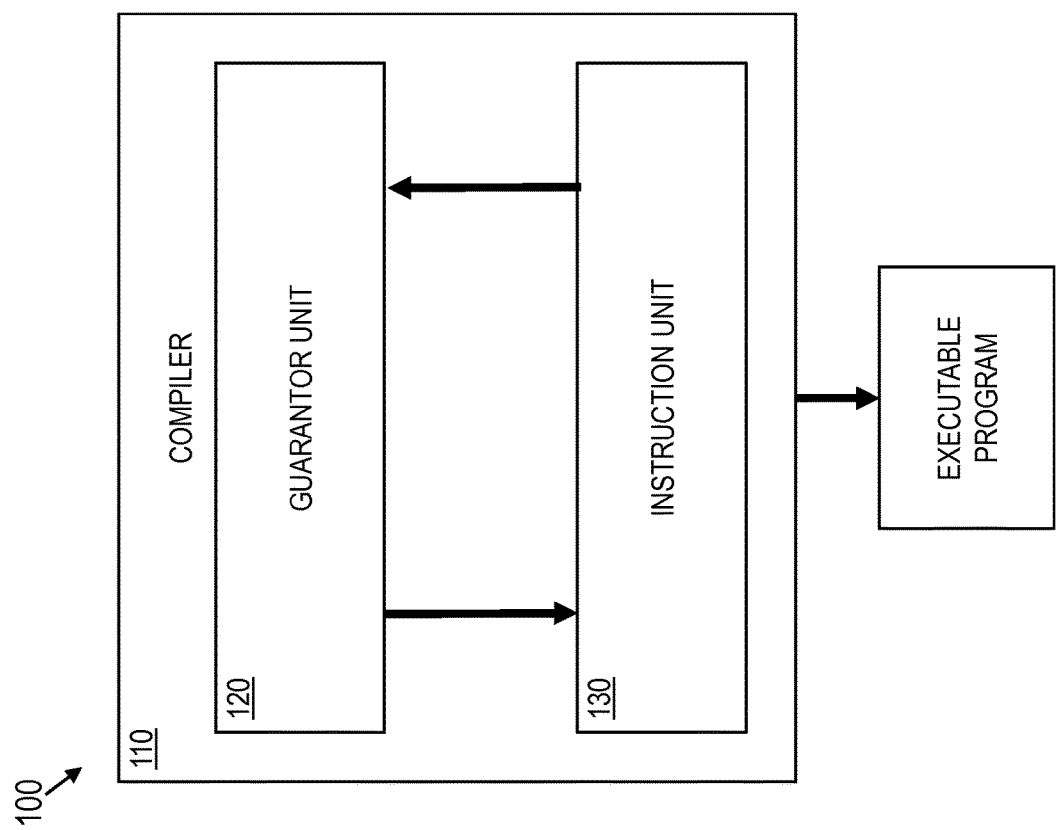
FIG. 1 is a block diagram of a coherence management system, according to some embodiments of this disclosure.

FIG. 1 is a block diagram of a coherence management system 100, according to some embodiments of this disclosure. The coherence management system 100 may be integrated, in whole or in part, in a compiler 110 used to compile source code into an executable program. The executable program, generated by the compiler 110, may include instructions executable by processing elements. As shown, the coherence management system 100 may include a guarantor unit 120 and an instruction unit 130. Generally, the guarantor unit 120 may guarantee that a store operation (i.e., a write operation) requires no coherence action, and due to that guarantee, the instruction unit 130 may generate a store-without-coherence-action instruction, which will be discussed further below. The guarantor unit 120 and the instruction unit 130 may be made up of software, hardware, or a combination of both. It will be understood that these units 120 and 130 may be integrated with other aspects of the compiler 110 and need not be distinct components as shown.

Figure 2:
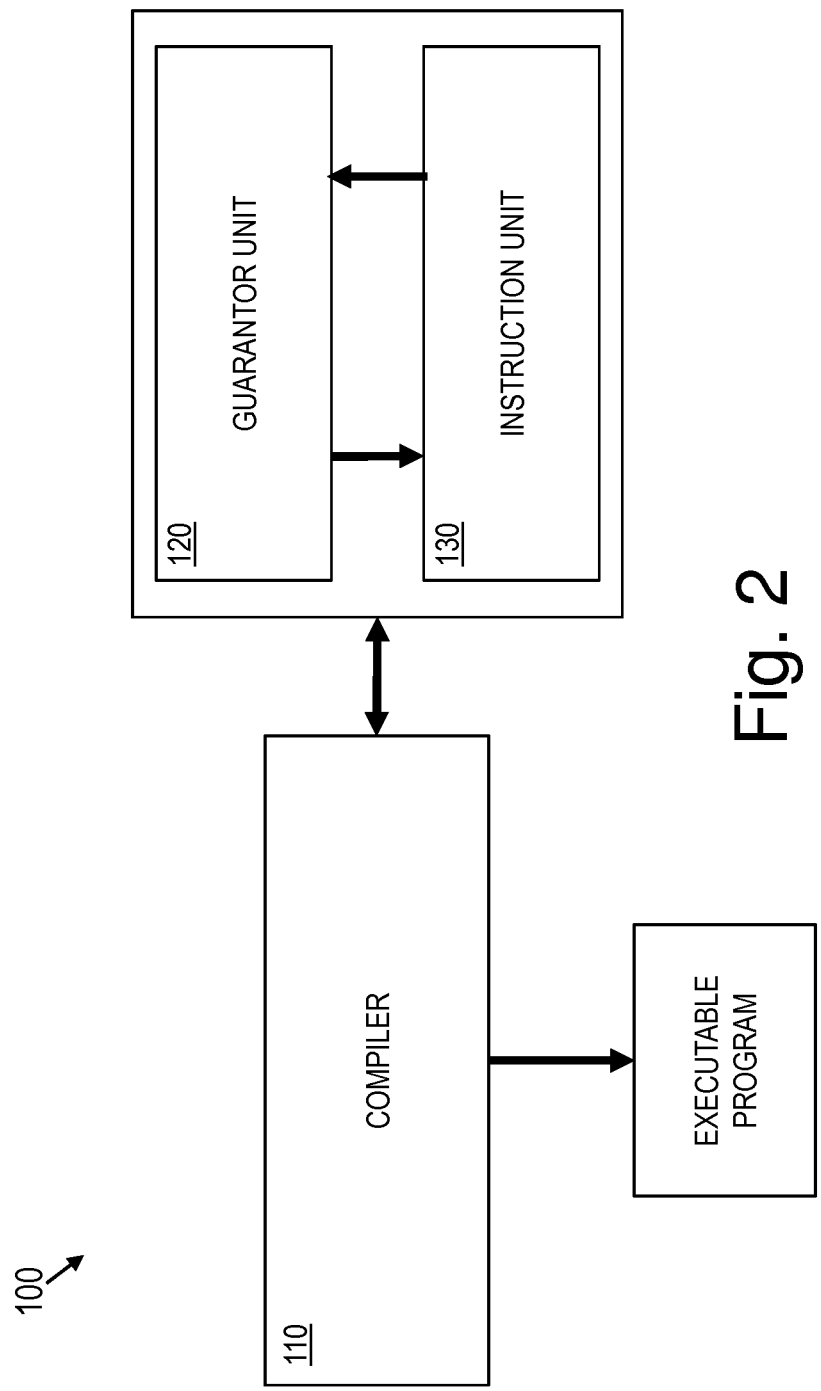
FIG. 2 is another block diagram of the coherence management, according to some embodiments of this disclosure.
Figure 3:
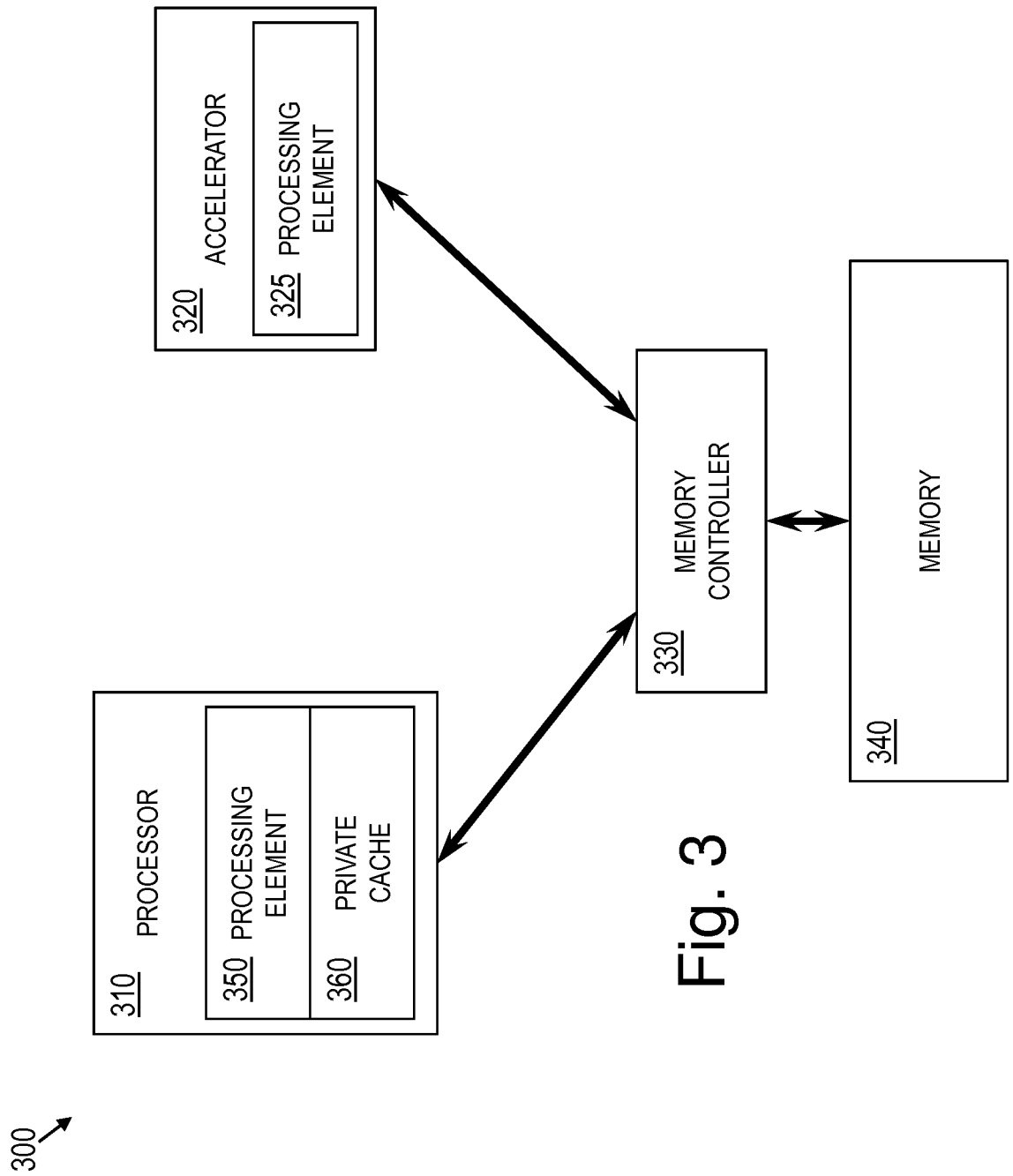
FIG. 3 is a block diagram of an execution environment for an executable program generated by the coherence management system, according to some embodiments of this disclosure.

FIG. 2 is another block diagram of the coherence management 100, according to some embodiments of this disclosure. In the embodiments of FIG. 1, the guarantor unit 120 and the instruction unit 130 are integrated into the compiler 110, but as shown in FIG. 3, this need not be the case. Rather, in some embodiments according to FIG. 3, the guarantor unit 120 and the instruction unit 130 may be distinct from the compiler 110. In this case, the compiler 110 may be in communication with these units, so as to generate the store-without-coherence-action instruction.

FIG. 3 is a block diagram of an execution environment 300 for an executable program generated by the compiler 110. As shown, the environment 300 may include a processor 310, such as a central processing unit (CPU), as well as an accelerator 320, a memory controller 330, and a memory 340, which may be the main memory of a computer system 700 (see FIG. 7). It will be understood that, although only a single processor 310 and a single accelerator 320 are shown in FIG. 3, various additional processors 310 and accelerators 320 may also be included in the execution environment 300.

The processor 310 may be a host processor, while the accelerator 320 may be a hardware device for specialized or accelerated tasks, which may be offloaded from the processor 310. The processor 310 may include at least one processing element (PE) 350, which may be, for example, a processor core. The accelerator 320 may also include at least one PE 325.

As shown, in some embodiments, the processor 310 may have a private cache 360, such as a Level 1 (L1) cache, for each of its PEs 350. The PE 350 may be configured to access data in the private cache 360 more quickly, i.e., with reduced latency, than it can access the memory 340. To achieve cache coherence, the coherence management system 100 may ensure that data maintained in each private cache 360 is sufficiently consistent with data maintained in the memory 340.

In some embodiments, two forms of store instructions may be included in the instruction set architecture (ISA), a store-with-coherence-action instruction and a store-without-coherence-action instruction. These two store instructions may be generated, as needed, by the compiler 110 with the coherence management system 100 at compile time, and then later executed in the execution environment 300. In general, the store-with-coherence-action instruction may require that a store operation be performed along with a coherence action to ensure that cache coherence is maintained, while the store-without-coherence-action may require a store operation without a coherence action. The accelerator 320 may be configured to request from the memory controller 330 both types of store operations, and may be further configured to select which store operation to request based on the instruction being performed. More specifically, when executing a store-with-coherence-action instruction, the accelerator 320 may request a store operation to be performed with a coherence action, and when executing a store-without-coherence-action instruction, the accelerator 320 may request a store operation without a coherence action. The memory controller 330 may be configured to perform both types of store operations and to perform them selectively based on the request received.

Figure 4:
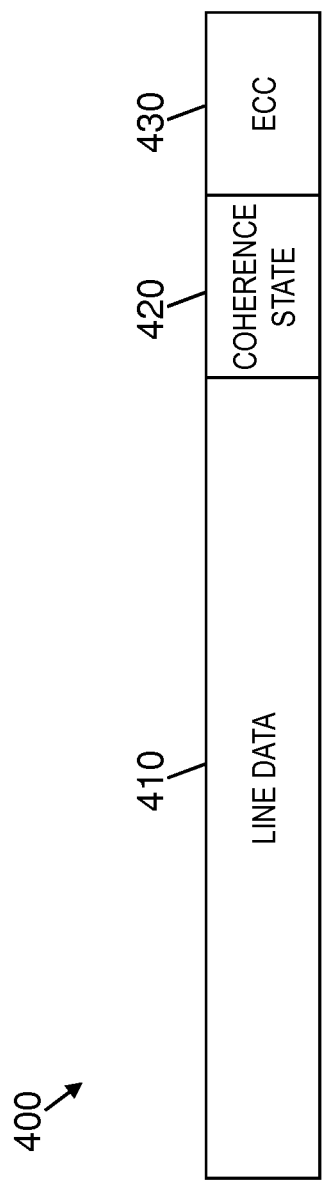
FIG. 4 is a diagram of an example memory line, according to some embodiments of this disclosure.

FIG. 4 is a diagram of an example memory line 400, according to some embodiments of this disclosure. As shown, the memory line 400 may include line data 410, a coherence state 420, and error-correcting code (ECC) 430. The line data 410 may be the data stored in the memory line 400; the coherence state 420 may provide information about cache coherence with respect to the memory line 400; and the ECC 430 may be data used to prevent corruption errors in the memory line 400. Each memory line 400 of this type may be stored in the memory 400, and in some cases, a copy may be stored in each of one or more private caches 360. A copy of a memory line 400 may share the same physical address as the memory line 400 stored in memory, but the line data 410 and coherence state 420 may occasionally vary.

The coherence state 420 may take various forms. For example, in some embodiments, the coherence state 410 may be a coherence bit. In that case, a value of 1 or TRUE may indicate that a copy of the memory line 400 exists in some private cache 360 in the computer system 700, while a value of 0 or FALSE may indicate no copy of the memory line 400 exists in a private cache 360. In some embodiments, the processor 310 may be aware, without checking all the private caches 360, of which private caches 360 have the memory line 400 and whether those private caches 360 have the memory line 400 in modified state (i.e., has been modified and therefore the version in memory 340 may not be current) or shared state (i.e., holds the same data as the memory 340). Thus, if the coherence bit is TRUE, the processor 310 may determine which private cache 360 has the memory line and in which state. In some other embodiments, the processor 310 need not have knowledge of which private caches 360 hold the memory line 400, but may be configured to broadcast an invalidate command to all private caches 360 as needed. Upon receiving such a command, a private cache 360 having the line in modified state may write the memory line 400 back to the memory 340, before flushing the memory line 400. Upon receiving such a command, a private cache 360 having the line in shared state may simply flush the memory line 400. In some other embodiments, however, the coherence state 420 may take more space than a single bit. In that case, the value of the coherence state 420 may indicate which private cache 360 is holding the memory line 400 and whether that memory line 400 in the private cache 360 is in modified state or shared state. Thus, as needed, the processor 310 may be able to address individual private caches 360 having the memory line 400.

In some cases, when a store operation is performed on a memory line 400 by an accelerator PE 325, a coherence action may be performed in conjunction with that store operation. The coherence action may include reading the coherence state, sending a message to the PEs 350 with private caches 360 holding copies of the memory line 400, and returning the line data 410 to the accelerator PE 325 requesting the store operation. The message sent may be dependent on the coherence state 420 and, if the processor 310 maintains information about which memory lines 400 are in which private caches 360, may also be dependent on this maintained information. The message may include a request to flush the memory line 400 from the private cache 360. For example, and not by way of limitation, if it is determined that a private cache 360 has a copy of the memory line 400 in the modified state, then the message may ask the applicable PE 350 to update the memory 340 based on the private cache 360, and then to flush the memory line 400 from the private cache 360. For another example, if it is determined that a private cache 360 has a copy of the memory line 400 in the shared state, then the message may simply be a request that the memory line 400 be flushed from the private cache 360.

According to some embodiments, a store-without-coherence-action instruction may be used to avoid the coherence action during a store operation. During compile-time, the compiler 110 may determine that certain store operations may be performed without the coherence action. Skipping the coherence action in those cases may result in reduced latency for those store operations. More specifically, in some embodiments, for each store instruction that the compiler 110 produces for an accelerator PE 325, the compiler 110 may analyze the code leading up to that instruction to determine whether the last access to the applicable memory line 400 could have been from the processor 110. If the memory line 400 was never before accessed, or if the last access was from an accelerator PE 325, then the compiler 110 may convert the store instruction to a store-without-coherence-action instruction to avoid performing a coherence action. In all other cases, including the case in which the compiler 110 is unable to make a determination about the last access, the store may be converted to a store-with-coherence-action instruction. In some embodiments, a store-without-coherence-action instruction may be generated by allowing a user to specify in the program (e.g., using a compiler directive to indicate that a touched code region is guaranteed to be owned by the accelerator 320) that the store-without-coherence-action instruction may be used.

If the processor 310 might have been last to access the memory line 400, then the memory line 400 in the private cache 360 of the processor 310 may potentially differ from the memory line 400 in memory 340. Thus, in that case, the compiler 110 may generate a store-with-coherence-action instruction for that store operation, thus requiring the coherence action to be performed. If, however, the compiler 110 can guarantee based on prior operations that the memory line 400 was not last accessed by the processor 310, a coherence action need not be performed because there are no copies of the memory line 400 in the private caches 360. In this case, the compiler 110 may generate a store-without-coherence-action instruction, which may avoid the performance cost of the coherence action.

During execution of the instructions, when the store-without-coherence-action instruction is encountered, the accelerator 320 may attempt to combine the encountered store-without-coherence-action instruction with other store-without-coherence-action instructions for adjacent addresses in the memory 340. If the accelerator 320 is able to combine these instructions to obtain a full ECC unit (i.e., a full unit to which the ECC 430 applies), the accelerator 320 may then issue the store operation for that full ECC unit, indicating to the memory controller that no coherence action is to be performed. For example, an ECC unit may be a sector, a full memory line 400, or some other length of data. In some other cases, however, the accelerator 320 may seek to combine store operations for a combination of store-without-coherence-action instructions and store-with-coherence-action instructions. In those cases, however, the accelerator may then issue a store request with a coherence action for the full ECC unit, allowing the coherence check to be performed. As a result of these combinations, the memory controller 330 may avoid having to read the full ECC unit in order to generate the ECC 430.

When issuing the store operation to the memory controller 330 for a store-without-coherence-action instruction, the accelerator 320 may indicate to the memory controller 330 that the coherence action is to be skipped or bypassed (i.e., no coherence action is to be performed). When performing such a store operation, the memory controller 330 need not read the coherence state 420 or send messages to private caches 360 that include the applicable line data 410. This store-without-coherence-action instruction may be used by the compiler 110 when it can be guaranteed that the memory line 400 was not last accessed by the processor 310, or that the accelerator 320 was last to access the memory line. Thus, in the case of the store-without-coherence-action instruction, it has been deemed safe to skip the coherence action.

Figure 5:
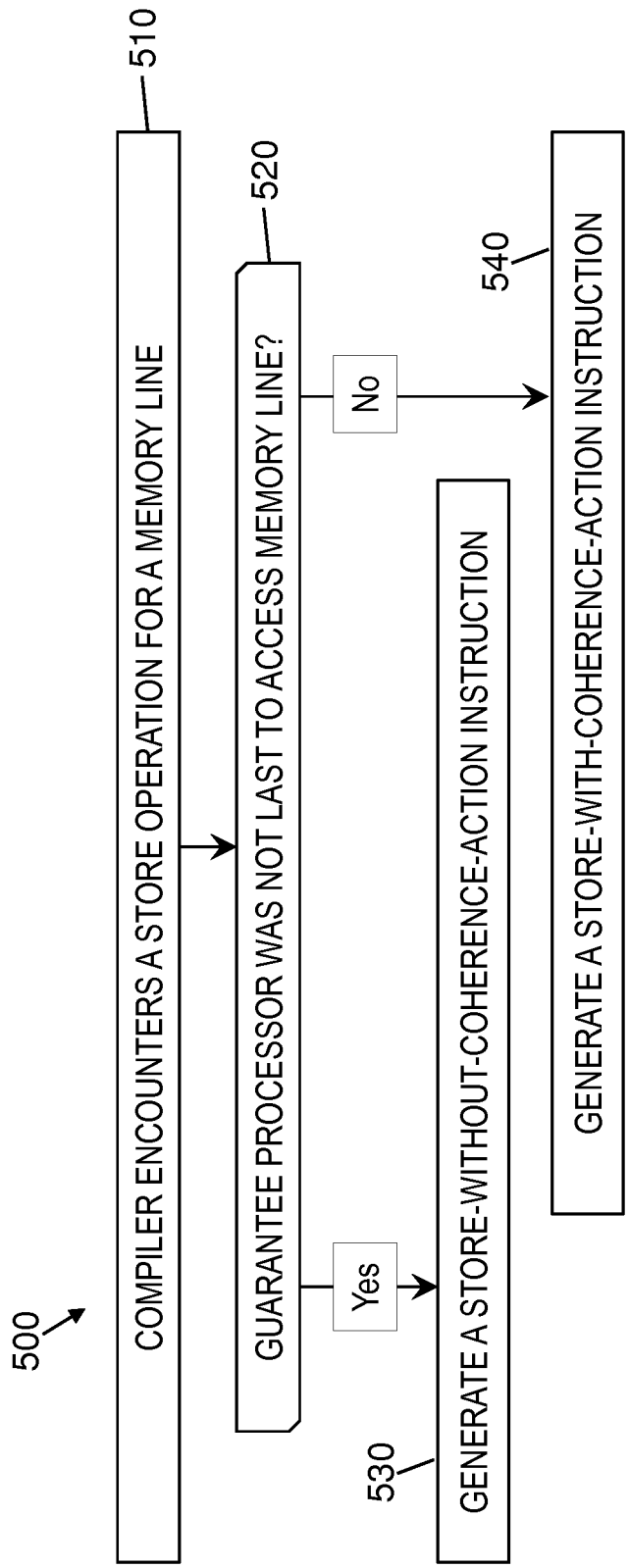
FIG. 5 is a flow diagram of a coherence management method, according to some embodiments of this disclosure.

FIG. 5 is a flow diagram of a coherence management method 500, according to some embodiments of this disclosure. As shown, at block 510, the compiler 110 may encounter in an accelerator code segment a store operation for a memory line 400. At decision block 520, the compiler 110 may determine whether it can guarantee that a processor PE 350 was not last to access the memory line 400. If the guarantee can be made, then at block 530, the compiler 110 may generate a store-without-coherence-action instruction for the store operation. Alternatively, at block 540, the compiler 110 may generate a store-with-coherence-action instruction. This method 500 may be repeated each time a store operation is encountered in the accelerator code segment during compile-time.

Figure 6:
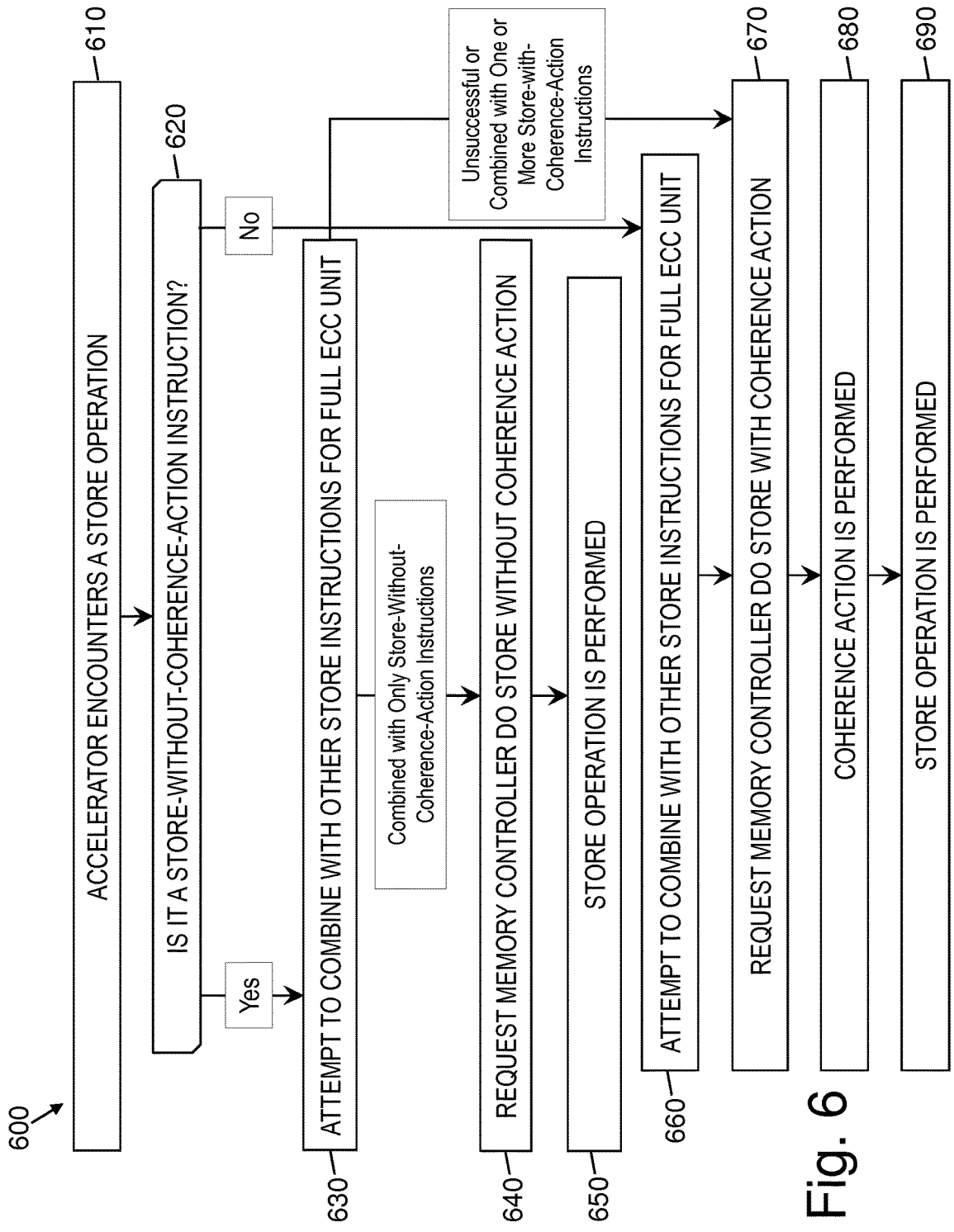
FIG. 6 is a flow diagram of another coherence management method, according to some embodiments of this disclosure.

FIG. 6 is a flow diagram of another coherence management method 600, according to some embodiments of this disclosure. As shown, at block 610, the accelerator 320 may encounter a store instruction. At decision block 620, the accelerator 320 may determine whether the store instruction is a store-without-coherence-action instruction. If so, then at block 630, the accelerator 320 may attempt to combine the store-without-coherence-action instruction with other store instructions to obtain a full ECC unit. If the instruction is combined only with other store-without coherence instructions for some full ECC unit, then the method 600 may proceed to block 640. If the combination is unsuccessful or successful only in combining the instruction with one or more store-with-coherence action instructions, the method 600 may proceed to block 670. At block 640, the accelerator 320 may request that the memory controller 330 perform a store operation without performing a coherence action. At block 650, the memory controller 330 may perform the store operation without the coherence action. Alternatively, if the store instruction is a store-with-coherence-action instruction, then at block 660, the accelerator 320 may attempt to combine the store-with-coherence-action instruction with other instructions to obtain a full ECC unit. At block 670, the accelerator 320 may request that the memory controller 330 perform a store operation with a coherence action. At block 680, the memory controller 330 may perform the coherence action, and at block 690, the store operation may be performed. This method 600 may be repeated for each store instruction encountered by the accelerator 320.

Figure 7:
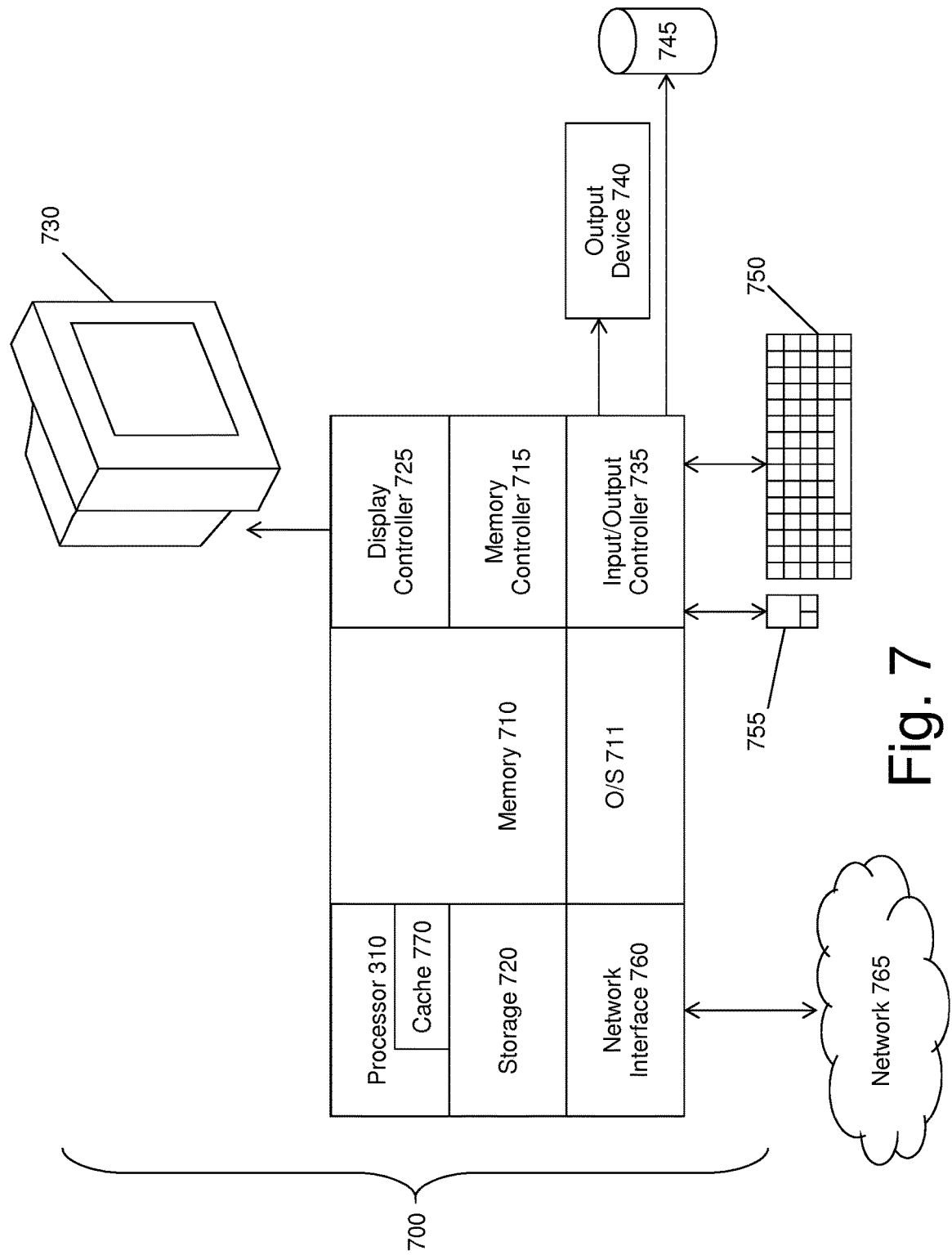
FIG. 7 is a block diagram of a computing device for implementing some or all aspects of the coherence management system, according to some embodiments of this disclosure.

FIG. 7 illustrates a block diagram of a computer system 700 for use in implementing a coherence management system or method according to some embodiments. The coherence management systems and methods described herein may be implemented in hardware, software (e.g., firmware), or a combination thereof. In an exemplary embodiment, the methods described may be implemented, at least in part, in hardware and may be part of the microprocessor of a special or general-purpose computer system 700, such as a personal computer, workstation, minicomputer, or mainframe computer.

In an exemplary embodiment, as shown in FIG. 7, the computer system 700 includes a processor 310, memory 710 coupled to a memory controller 715, and one or more input devices 745 and/or output devices 740, such as peripherals, that are communicatively coupled via a local I/O controller 735. These devices 740 and 745 may include, for example, a printer, a scanner, a microphone, and the like. A conventional keyboard 750 and mouse 755 may be coupled to the I/O controller 735. The I/O controller 735 may be, for example, one or more buses or other wired or wireless connections, as are known in the art. The I/O controller 735 may have additional elements, which are omitted for simplicity, such as controllers, buffers (caches), drivers, repeaters, and receivers, to enable communications.

The I/O devices 740, 745 may further include devices that communicate both inputs and outputs, for instance disk and tape storage, a network interface card (NIC) or modulator/demodulator (for accessing other files, devices, systems, or a network), a radio frequency (RF) or other transceiver, a telephonic interface, a bridge, a router, and the like.

The processor 310 is a hardware device for executing hardware instructions or software, particularly those stored in memory 710. The processor 310 may be a custom made or commercially available processor, a CPU, an auxiliary processor among several processors associated with the computer system 700, a semiconductor based microprocessor (in the form of a microchip or chip set), a macroprocessor, or other device for executing instructions. The processor 310 includes a cache 770, which may include, but is not limited to, an instruction cache to speed up executable instruction fetch, a data cache to speed up data fetch and store, and a translation lookaside buffer (TLB) used to speed up virtual-to-physical address translation for both executable instructions and data. The cache 770 may be organized as a hierarchy of more cache levels (L1, L2, etc.).

The memory 710 may include one or combinations of volatile memory elements (e.g., random access memory, RAM, such as DRAM, SRAM, SDRAM, etc.) and nonvolatile memory elements (e.g., ROM, erasable programmable read only memory (EPROM), electronically erasable programmable read only memory (EEPROM), programmable read only memory (PROM), tape, compact disc read only memory (CD-ROM), disk, diskette, cartridge, cassette or the like, etc.). Moreover, the memory 710 may incorporate electronic, magnetic, optical, or other types of storage media. Note that the memory 710 may have a distributed architecture, where various components are situated remote from one another but may be accessed by the processor 310.

The instructions in memory 710 may include one or more separate programs, each of which comprises an ordered listing of executable instructions for implementing logical functions. In the example of FIG. 7, the instructions in the memory 710 include a suitable operating system (OS) 711. The operating system 711 essentially may control the execution of other computer programs and provides scheduling, input-output control, file and data management, memory management, and communication control and related services.

Additional data, including, for example, instructions for the processor 310 or other retrievable information, may be stored in storage 720, which may be a storage device such as a hard disk drive or solid state drive. The stored instructions in memory 710 or in storage 720 may include those enabling the processor to execute one or more aspects of the coherence management systems and methods of this disclosure.

The computer system 700 may further include a display controller 725 coupled to a display 730. In an exemplary embodiment, the computer system 700 may further include a network interface 760 for coupling to a network 765. The network 765 may be an IP-based network for communication between the computer system 700 and an external server, client and the like via a broadband connection. The network 765 transmits and receives data between the computer system 700 and external systems. In an exemplary embodiment, the network 765 may be a managed IP network administered by a service provider. The network 765 may be implemented in a wireless fashion, e.g., using wireless protocols and technologies, such as WiFi, WiMax, etc. The network 765 may also be a packet-switched network such as a local area network, wide area network, metropolitan area network, the Internet, or other similar type of network environment. The network 765 may be a fixed wireless network, a wireless local area network (LAN), a wireless wide area network (WAN) a personal area network (PAN), a virtual private network (VPN), intranet or other suitable network system and may include equipment for receiving and transmitting signals.

Coherence management systems and methods according to this disclosure may be embodied, in whole or in part, in computer program products or in computer systems 700, such as that illustrated in FIG. 7.

Technical effects and benefits of some embodiments include the use of a store instruction indicating that a coherence action is to be skipped. As a result, some embodiments of the coherence management system provide reduced latency and improved bandwidth utilization over existing cache coherence management, while still maintaining cache coherence.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system comprising:
   a memory having computer readable instructions; and
   one or more processors communicatively coupled to the memory, the one or more processors configured to:
      encounter a store operation during a compile-time of a program, the store operation applicable to a memory line;
      determine that a last processing element to access the memory line prior to the store operation is part of an accelerator; and
      generate, during the compile-time of the program, a store-without-coherence-action instruction for the store operation, responsive to the last processing element to access the memory line prior to the store operation being part of the accelerator;
      wherein the store-without-coherence-action instruction specifies that the store operation be performed without a cache coherence action, and wherein cache coherence is maintained upon execution of the store-without-coherence-action instruction.

2. The system of claim 1, wherein, to determine that the last processing element to access the memory line prior to the store operation is part of the accelerator, the one or more processors are further configured to review one or more operations prior to the store operation.

3. The system of claim 1, wherein the store-without-coherence-action instruction is executable by the accelerator, and wherein, when executing the store-without-coherence-action instruction, the accelerator is configured to request that the store operation without the coherence action be performed by a memory controller.

4. The system of claim 3, wherein the memory controller is configured to skip the coherence action in response to the request.

5. The system of claim 1, wherein the generating a store-without-coherence-action instruction for the store operation is performed by way of a compiler, and wherein the compiler is further configured to generate a store-with-coherence-action instruction.

6. The system of claim 1, wherein the one or more processors are further configured to:
   encounter a second store operation during the compile-time of the program, the second store operation applicable to a second memory line;
   determine that a cache coherence action is necessary for the second store operation; and
   generate, during the compile-time of the program, a store-with-coherence-action instruction for the store operation, responsive to the determining that the cache coherence action is necessary for the second store operation, wherein the store-with-coherence-action instruction specifies that the second store operation be performed with the cache coherence action.

7. A computer program product for maintaining cache coherence, the computer program product comprising a computer readable storage medium having program instructions embodied therewith, the program instructions executable by a processor to cause the processor to perform a method comprising:
   encountering a store operation during a compile-time of a program, the store operation applicable to a memory line;
   determining that a last processing element to access the memory line prior to the store operation is part of an accelerator; and
   generating, during the compile-time of the program, a store-without-coherence-action instruction for the store operation, responsive to the last processing element to access the memory line prior to the store operation being part of the accelerator;
   wherein the store-without-coherence-action instruction specifies that the store operation be performed without a cache coherence action, and wherein cache coherence is maintained upon execution of the store-without-coherence-action instruction.

8. The computer program product of claim 7, wherein the determining that the last processing element to access the memory line prior to the store operation is part of the accelerator comprises reviewing one or more operations prior to the store operation.

9. The computer program product of claim 7, wherein the store-without-coherence-action instruction is executable by the accelerator, and wherein, when executing the store-without-coherence-action instruction, the accelerator is configured to request that the store operation without the coherence action be performed by a memory controller.

10. The computer program product of claim 9, wherein the memory controller is configured to skip the coherence action in response to the request.

11. The computer program product of claim 7, wherein the generating a store-without-coherence-action instruction for the store operation is performed by a compiler, and wherein the compiler is further configured to generate a store-with-coherence-action instruction.

12. The computer program product of claim 7, the method further comprising:
   encountering a second store operation during the compile-time of the program, the second store operation applicable to a second memory line;
   determining that a cache coherence action is necessary for the second store operation; and
   generating, during the compile-time of the program, a store-with-coherence-action instruction for the store operation, responsive to the determining that the cache coherence action is necessary for the second store operation, wherein the store-with-coherence-action instruction specifies that the second store operation be performed with the cache coherence action.

* * * * *